(12) United States Patent
Skog

(10) Patent No.: US 10,079,771 B2
(45) Date of Patent: Sep. 18, 2018

(54) CONGESTION CONTROL IN A COMMUNICATIONS NETWORK

(71) Applicant: Telefonaktiebolaget L M Ericsson (publ), Stockholm (SE)

(72) Inventor: Robert Skog, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 116 days.

(21) Appl. No.: 14/891,992

(22) PCT Filed: May 20, 2013

(86) PCT No.: PCT/SE2013/050569
§ 371 (c)(1),
(2) Date: Nov. 18, 2015

(87) PCT Pub. No.: WO2014/189414
PCT Pub. Date: Nov. 27, 2014

(65) Prior Publication Data
US 2016/0094470 A1 Mar. 31, 2016

(51) Int. Cl.
*H04L 12/875* (2013.01)
*H04W 28/02* (2009.01)
(Continued)

(52) U.S. Cl.
CPC ............ *H04L 47/562* (2013.01); *H04L 47/32* (2013.01); *H04W 28/0205* (2013.01);
(Continued)

(58) Field of Classification Search
CPC ....... H04L 47/10; H04L 47/11; H04L 47/562; H04L 47/32; H04L 47/127; H04W 52/343; H04W 52/0235
See application file for complete search history.

(56) References Cited

U.S. PATENT DOCUMENTS 9,288,434 B2 * 3/2016 Bangolae .......... H04W 36/0066
2002/0035642 A1 * 3/2002 Clarke .................... H04L 47/10
709/244
(Continued)

FOREIGN PATENT DOCUMENTS

WO 2013/176591 A1 11/2013

OTHER PUBLICATIONS

IEEE Document, LEDBAT: the new BitTorrent congestion control protocol; Sep. 2, 2010.*
(Continued)

*Primary Examiner* — Kashif Siddiqui
(74) *Attorney, Agent, or Firm* — Rothwell, Figg, Ernst & Manbeck, p.c.

(57) ABSTRACT

A method of congestion control (500) in a communications network is provided. The method comprises detecting congestion (501, 502) for data packets being transmitted along a data path between a sender and a receiver of the communications network, wherein the receiver accesses the communications network via a Radio Access Network (RAN), interrupting transmission (503, 505, 506) of data packets to the receiver during an idle period, and transmitting an indication (504) pertaining to the interruption of transmission to the RAN. Thereby, the RAN may use opportunities for switching to a lower radio state directly, or shortly after, the onset of the idle period, rather than triggered by an inactivity timer. In that way, utilization of air interface resources is improved and power consumption on the UE side is reduced. Further, a corresponding computer program, a corresponding computer program product, and a network node for congestion control in a communications network, are provided.

17 Claims, 4 Drawing Sheets

(51) Int. Cl.
*H04W 52/02* (2009.01)
*H04L 12/823* (2013.01)
*H04L 12/893* (2013.01)

(52) U.S. Cl.
CPC ... *H04W 28/0221* (2013.01); *H04W 28/0236* (2013.01); *H04W 28/0284* (2013.01); *H04W 28/0289* (2013.01); *H04W 52/0235* (2013.01); *H04L 47/40* (2013.01); *Y02D 70/00* (2018.01); *Y02D 70/1242* (2018.01); *Y02D 70/1262* (2018.01); *Y02D 70/142* (2018.01)

(56) References Cited

U.S. PATENT DOCUMENTS

| | | | | |
|---|---|---|---|---|
| 2004/0033806 | A1* | 2/2004 | Daniel | H04W 72/085 455/450 |
| 2006/0126509 | A1* | 6/2006 | Abi-Nassif | H04L 47/10 370/235 |
| 2006/0159016 | A1* | 7/2006 | Sagfors | H04L 47/12 370/230 |
| 2007/0254598 | A1* | 11/2007 | Bachl | H04L 27/261 455/73 |
| 2007/0274227 | A1* | 11/2007 | Rauscher | H04L 43/0858 370/252 |
| 2010/0260096 | A1* | 10/2010 | Ulupinar | H04B 7/2606 370/315 |
| 2010/0265861 | A1* | 10/2010 | He | H04L 47/14 370/311 |
| 2010/0302946 | A1* | 12/2010 | Yang | H04B 7/155 370/235 |
| 2010/0309788 | A1* | 12/2010 | Ho | H04L 47/10 370/236 |
| 2010/0322243 | A1* | 12/2010 | Clark | H04L 47/10 370/389 |
| 2011/0026464 | A1* | 2/2011 | Chen | H04J 3/0658 370/328 |
| 2011/0063977 | A1* | 3/2011 | Halfmann | H04L 47/10 370/235 |
| 2011/0096665 | A1* | 4/2011 | McCann | H04L 47/10 370/235 |
| 2013/0308451 | A1* | 11/2013 | Townend | H04L 1/0009 370/230 |
| 2014/0043975 | A1* | 2/2014 | Zhu | H04W 28/02 370/235 |
| 2014/0056128 | A1* | 2/2014 | Racz | H04W 28/0205 370/229 |
| 2014/0269302 | A1* | 9/2014 | Morandin | H04L 47/27 370/235 |
| 2014/0282811 | A1* | 9/2014 | Lohmar | H04L 65/80 725/146 |
| 2014/0286258 | A1* | 9/2014 | Chowdhury | H04L 1/1812 370/329 |
| 2015/0003312 | A1* | 1/2015 | Jeong | H04W 52/0235 370/311 |

OTHER PUBLICATIONS

Siekkinen, Matti et al., "Streaming over 3G and LTE," Mobile Video, ACM, 2 Penn Plaza, Suite 701, New York, NY 10121-0701-US, Feb. 27, 2013, pp. 13-18, XP058018251.

V1 GSM Association: "Fast Dormancy Best Practices," Jul. 27, 2011, XP055100551. Retrieved from the Internet: URL:http://www.gsma.com/newsroom/wp-content/uploads/2013/08/TS18v1-0.pdf (retrieved on Feb. 5, 2014).

Shalunov, S., et al., Low Extra Delay Background Transport (LEDBAT), Internet Engineering Task Force (IETF), Request for Comments: 6817, ISSN: 2070-1721, Dec. 2012, 25 pages.

\* cited by examiner

CONGESTION CONTROL IN A COMMUNICATIONS NETWORK

CROSS-REFERENCE TO RELATED APPLICATIONS

This application is a filing under 35 USC 371 of International Application No. PCT/SE2013/050569, filed May 20, 2013, designating the United States. The contents of the application is incorporated by reference.

TECHNICAL FIELD

The invention relates to a method of congestion control in a communications network, a corresponding computer program and computer program product, and a network node for congestion control in a communications network.

BACKGROUND

One of the main tasks of the Transmission Control Protocol (TCP), which is the transport layer of the TCP/Internet protocol (IP) suite, is congestion control. For this purpose, TCP uses a number of mechanisms to achieve high performance and avoid situations of degrading network performance. These mechanisms control the rate of data entering the network, keeping the data flow below a rate that would trigger collapse. They also attempt to achieve an approximately fair allocation between different flows in the network.

TCP utilizes acknowledgments for successfully received data packets, or lack of such acknowledgments, for inferring network conditions along a data path between the sender and the receiver of a TCP connection. Based on transmission time, or round-trip time, measurements and utilizing timers, TCP senders and receivers can alter the flow of data packets through the network.

Low Extra Delay Background Transport (LEDBAT) is a delay-based congestion control mechanism which attempts to utilize the available bandwidth on an end-to-end path through a communications network, i.e., on a data path from a sender to a receiver, while limiting an increase in queuing delay along that path (see, e.g., Internet Engineering Task Force (IETF), RFC 6817). LEDBAT utilizes changes in the measured one-way delay along the data path to limit congestion which the flow itself induces in the network. LEDBAT is designed for use by background transfer applications, limiting interference with the network performance of competing flows. LEDBAT can be used as part of a transport protocol, such as TCP, or as part of an application, as long as the data transmission mechanisms are capable of carrying timestamps and acknowledging data frequently.

LEDBAT employs one-way delay measurements, based on a timestamp from the sender which each data packet carries, in order to detect an increase in queuing delay, which is an early signal of congestion. When the estimated queuing delay exceeds a predetermined target, or threshold, which is on the order of few tens to several hundreds of milliseconds, LEDBAT decreases the sending rate, using a congestion window at the sender side, in order to mitigate or prevent congestion in the network. The response of the sender, i.e., the decrease in sending rate by increasing the time interval between subsequent transmissions of data packets, is typically proportional to the difference between the estimated queuing delay and the target delay. The idle time period between subsequent transmissions is of the order of a few seconds or a few tens of seconds.

In the event that a communications network, such as a Local Area Network (LAN), Wide Area Network (WAN), Internet, or the like, comprises a Radio Access Network (RAN) through which the receiver access the communications network, the described congestion control mechanisms, and in particular LEDBAT, may have a negative impact on resource usage in the RAN. This situation relates, e.g., to a User Equipment (UE), such as a mobile phone, smart phone, tablet, computer, media player, or the like, downloading data from a server (the sending node or sender) via the RAN using a wireless radio-frequency access technology such as Universal Mobile Telecommunications System (UMTS), Wideband Code Division Multiple Access (WCDMA), Long Term Evolution (LTE), Wireless LAN (WLAN) or WiFi, or the like.

Radio networks typically employ a state machine in the RAN and the UE to support radio states with different transmission bitrates over the radio interface and corresponding resource consumption, such as associated control signaling, allocated frequency bands and time slots, and power consumption in the UE. In UMTS, these states are referred to as Radio Resource Control (RRC) states. Some of the RRC states, and the possible transitions between the states (indicated by arrows), are illustrated in FIG. 1.

In general, radio states which provide the UE with a higher bitrate require more resources, and vice versa. The states in the RRC Connected Mode are, in order of decreasing bitrate and resource consumption: CELL_DCH (Dedicated Channel), CELL_FACH (Forward Access Channel), CELL_PCH (Cell Paging Channel) and URA_PCH (URA Paging Channel). The power consumption in the CELL_FACH is roughly 50% of that in CELL_DCH, and the PCH state uses about 1-2% of the power of the CELL_DCH state. In LTE, the radio state having the highest bitrate and resource consumption is the Active sub-state of Connected Mode.

Due to the delay and resource cost associated with switching radio states, switching to a lower radio state is only effected if the idle period is sufficiently long so that the resources conserved by switching to a lower radio state are sufficiently greater than the resources expended to switch to the lower radio state and then back to the higher radio state. Typically, switching to a lower radio state is triggered by detecting an idle period of data traffic using inactivity timers T1 and T2, illustrated in FIG. 1. The inactivity timers are configured by an operator of the RAN and are typically of the order of 2 seconds and 10 seconds, respectively.

In connection with congestion mechanisms such as LEDBAT, an increase of the idle time period between subsequent transmissions of data packets at the sender, as described hereinbefore, may result in a less efficient utilization of air interface resources as well as the UE battery. That is, the RAN and the UE may continue to reside in a high radio state while the sender has interrupted transmission of data packets for an idle time period in order to reduce the sending rate. During that idle period, until an inactivity timer triggers switching to a lower radio state, resources of the RAN and the UE are wasted for supporting a high-bitrate radio state which is not used for transmitting data to the UE. Furthermore, since the amount of data to be transmitted is not reduced, the RAN and the UE have to reside in higher radio states for a longer period of time. This is illustrated in FIG. 2, which shows transmission of three data bursts, each data burst comprising one or more data packets, for different scenarios.

The first diagram 210 illustrates transmission of data bursts 211-213, with idle periods 214 and 215 in-between subsequent bursts, and an inactivity timer of duration 216. When the first burst 211 is transmitted over the air interface, the RAN and the UE switch from a low radio state to a high radio state. Since the duration 216 of the inactivity timer exceeds the length of the idle periods 214 and 215, the RAN and the UE reside in the high radio state until the inactivity timer 216 triggers switching to the low radio state after transmission of the third data packet 213. The resource utilization of the RAN and the UE is illustrated in the lower part of diagram 210, where allocated resources which are not used for data transmission, i.e., wasted resources, are marked black 217.

If the idle periods in-between subsequent transmissions are increased, e.g., in response to detecting congestion along the data path, the situation depicted in diagram 220 of FIG. 2 may arise. In diagram 220, the idle periods 224 and 225 are increased as compared to diagram 210. Since the idle period 224 is still shorter than the duration of inactivity timer 216, the RAN and the UE will reside in the high radio state. Idle period 225, however, exceeds the duration 216 of the inactivity timer, resulting in a switching of the RAN and the UE to the low radio state, only to switch to the high radio state for transmitting the third data burst 223. As can be seen in the lower part of diagram 220, the amount of no-utilized radio resources (marked black 227) has increased as compared to diagram 210. This results in a less efficient utilization of radio resources, such as scheduled time slots and frequency bands, and a corresponding decrease in UE battery lifetime. In particular if congestion prevails for a longer period of time, and depending on the configuration of the sender's congestion time window and the inactivity timers of the RAN, the RAN and the UE are repetitively forced to switch to a high radio state when the sender resumes transmission of data, only to switch again to a less resource consuming radio state during idle periods.

SUMMARY

It is an object of the invention to provide an improved alternative to the above techniques and prior art.

More specifically, it is an object of the invention to provide an improved congestion mechanism in a communications network. In particular, it is an object of the invention to provide a congestion mechanism, e.g., a TCP congestion mechanism, which is more radio friendly.

These and other objects of the invention are achieved by means of different aspects of the invention, as defined by the independent claims. Embodiments of the invention are characterized by the dependent claims.

According to a first aspect of the invention, a method of congestion control in a communications network is provided. The method comprises detecting congestion for data packets being transmitted along a data path between a sending node of the communications network and a receiving node of the communications network. The receiving node accesses the communications network via a RAN. The method further comprises interrupting transmission of data packets to the receiving node during an idle period, and transmitting an indication pertaining to the interruption of transmission to the RAN.

According to a second aspect of the invention, a computer program is provided. The computer program comprises computer program code. The computer program code is adapted, if executed on a processor, to implement the method according to the first aspect of the invention.

According to a third aspect of the invention, a computer program product is provided. The computer program product comprises a computer readable storage medium. The computer readable storage medium has the computer program according to the second aspect of the invention embodied therein.

According to a fourth aspect of the invention, a network node for congestion control in a communications network is provided. The network node comprises a processor and a memory. The memory comprises instructions executable by the processor, whereby the network node is operative to detect congestion for data packets being transmitted along a data path between a sending node of the communications network and a receiving node of the communications network. The receiving node accesses the communications network via a RAN. The network node is further operative to interrupt transmission of data packets to the receiving node during an idle period, and transmit an indication pertaining to the interruption of transmission to the RAN.

The invention makes use of an understanding that congestion control in a communications network, wherein the receiving node accesses the communications network via a RAN, can be made for radio friendly by transmitting an indication to the RAN that data transmission is interrupted during an idle time period, allowing the RAN to use opportunities for switching to a lower radio state directly or shortly after the onset of the idle period, rather than in response to an inactivity timer which has expired. In that way, utilization of air interface resources may be improved and power consumption, in particular on the UE side, reduced. After the idle period, transmission of data packets is resumed and the RAN may switch to a higher radio state in order to provide the receiving UE with a radio link supporting a high bitrate.

Embodiments of the invention may be based on any type of congestion mechanism which is based on interrupting transmission of data packets to the receiver for an idle time period if congestion is detected along the data path connecting sender and receiver, and in particular TCP congestion mechanisms such as LEDBAT. The communications network may be any combination of different network technologies or and architectures, such as LAN, WAN, Internet, fixed and wireless access networks, and so forth, wherein the communications network comprises a RAN through which the receiving node accesses the communications network and retrieves data from a sending node, such as a server providing data for download, e.g., software updates. The RAN may, e.g., be a cellular network, such as UMTS or LTE, or a WLAN, utilizing a state machine of radio states having different data bitrates and resource consumption associated with them. The receiving node may be a UE such as a mobile phone, smart phone, tablet, computer, media player, or the like. It will further be appreciated that the RAN comprises a control node responsible for effecting switching between different radio states, such as a Radio Network Controller (RNC), Radio Base Station (RBS), NodeB, eNodeB, Base Station Controller (BSC), or the like.

According to an embodiment of the invention, the indication pertains to an onset of the idle period. In other words, the indication is sent to notify the RAN of the onset of the idle period. Preferably, the indication is transmitted simultaneously with the onset of the idle period. For instance, the indication may be transmitted after the last data packet has been transmitted prior to the onset of the idle period.

According to an embodiment of the invention, the indication comprises a TCP termination indication. In other words, the TCP connection between a network node performing congestion control, such as a TCP proxy, and the UE is terminated. The TCP connection is terminated by transmitting a FIN packet which may serve as an indication to the RAN that transmission is interrupted.

According to an embodiment of the invention, the indication comprises a signal. In this case, rather than relying on using the termination of the TCP connection as an indication of the onset of the silent period, a signal, or message, separate from the data connection is transmitted to the RAN. The signal may be sent in-band or out-of-band. The signal may, e.g., be an End-of-Burst (EoB) signal which indicates the end of a burst of data which is transmitted prior to the onset of the idle period.

According to an embodiment of the invention, the indication is transmitted to a control node of the RAN. Typically, a RAN comprises one or more control nodes, such as RNC, RBS, NodeB, eNodeB, BSC, or the like, for effecting switching between different radio states. Such functionality may be part of an RRC function of the control node which orders the UE, by control signaling, to change to a different radio state.

According to an embodiment of the invention, the detecting congestion comprises determining a queuing delay for the data path, and deciding that congestion exists if the queuing delay exceeds a threshold value. Alternatively, round trip time or any other delay measure which is indicative of traffic flow or congestion may be used. The threshold value may be set depending on network conditions and like, and may be of the order of a few tens or hundreds milliseconds.

According to an embodiment of the invention, the queuing delay is determined based on a timestamp comprised in at least some of the transmitted data packets and a time of reception at the receiving node. The timestamp indicates a time of transmission. For instance, in LEDBAT the queuing delay is determined at the sender based on the difference between the time of reception at the sender and the time of transmission, i.e., the timestamp, and signaled to the sender.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 3:
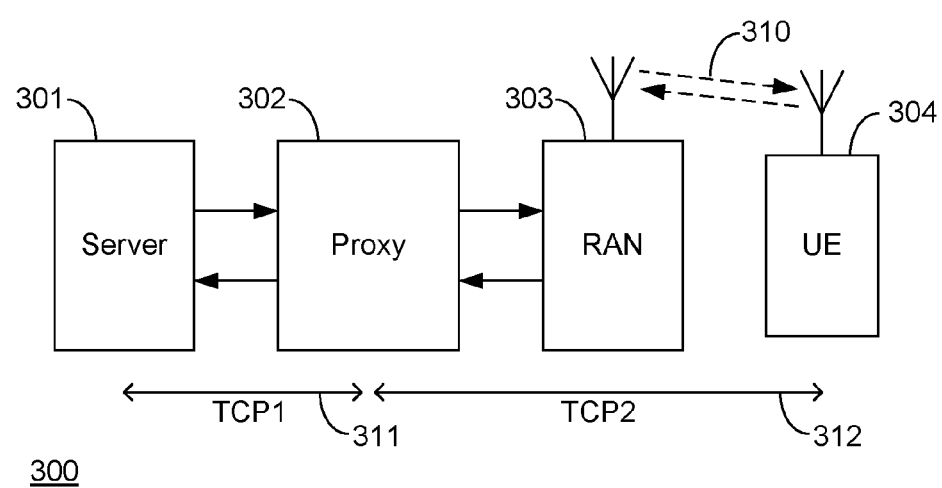
FIG. 3 illustrates a communications network, in accordance with an embodiment of the invention.

For the purpose of elucidating the invention, a communications network is illustrated in FIG. 3, in accordance with an embodiment of the invention.

Communications network 300 comprises a server 301, a proxy 302, a RAN 303, and a UE 304. The UE 304 access the communications network 300 via the RAN 303 by effecting wireless communications 310 with an access node, such as RBS, NodeB, or eNodeB, of the RAN 303. Data is transmitted from the server 301, which may be a provider of media content, software updates, or any other type of data, via the proxy 302 and the RAN 303 to the UE 304.

The proxy 302 may be a TCP proxy or any other type of network node involved in delivering or routing data packets from the server 301 to the UE 304. Here, it is assumed the proxy 302 has the task of performing congestion control in communications network 300. In the present disclosure, the invention is described in relation to LEDBAT, which is a TCP congestion mechanism designed for detecting congestion along a data path through the communications network 300 and mitigating, or preventing, congestion by reducing the transmission rate at the sender. In this respect, the proxy 302 is considered to be the sender and the UE 304 is considered to be the receiver. Thus, the proxy 302 and the UE 304 are the end points of the data path for which congestion control is performed.

For the example illustrated in FIG. 3, a first TCP connection 311 (TCP1) is set up between the server 301 and the proxy 302, and a second TCP connection 312 (TCP2) is set up between the proxy 302 and the UE 304. In other words, the proxy receives data packets from the sever 301 using TCP1 311 and forwards the received data packets to the UE 304, via the RAN 303, using TCP2 312. By using two separate TCP connections TCP1 311 and TCP2 312, the proxy 302 has the possibility to control the transmission rate over TCP2 312. This may be achieved by adjusting the time interval between two subsequent transmissions of data packets over TCP2 312. In particular, if congestion is detected along the data path of TCP2 312, the time interval between subsequent data packets is increased by interrupting the transmission of data packets over TCP2 312 during an idle time period, which may last for a few seconds up to a few tens of seconds. That is, in the event of congestion along TCP2 312, a data packet received from the server 301 over TCP1 311 is not forwarded directly by the proxy 302 to the UE 304. Rather, that data packet is transmitted over TCP2 312 only after the idle period has lapsed.

An embodiment of the proposed congestion control mechanism is now described with reference to a sequence diagram 400 shown in FIG. 4, which illustrates signaling between the nodes 301-304 of communications network 300 described with reference to FIG. 3.

Figure 4:
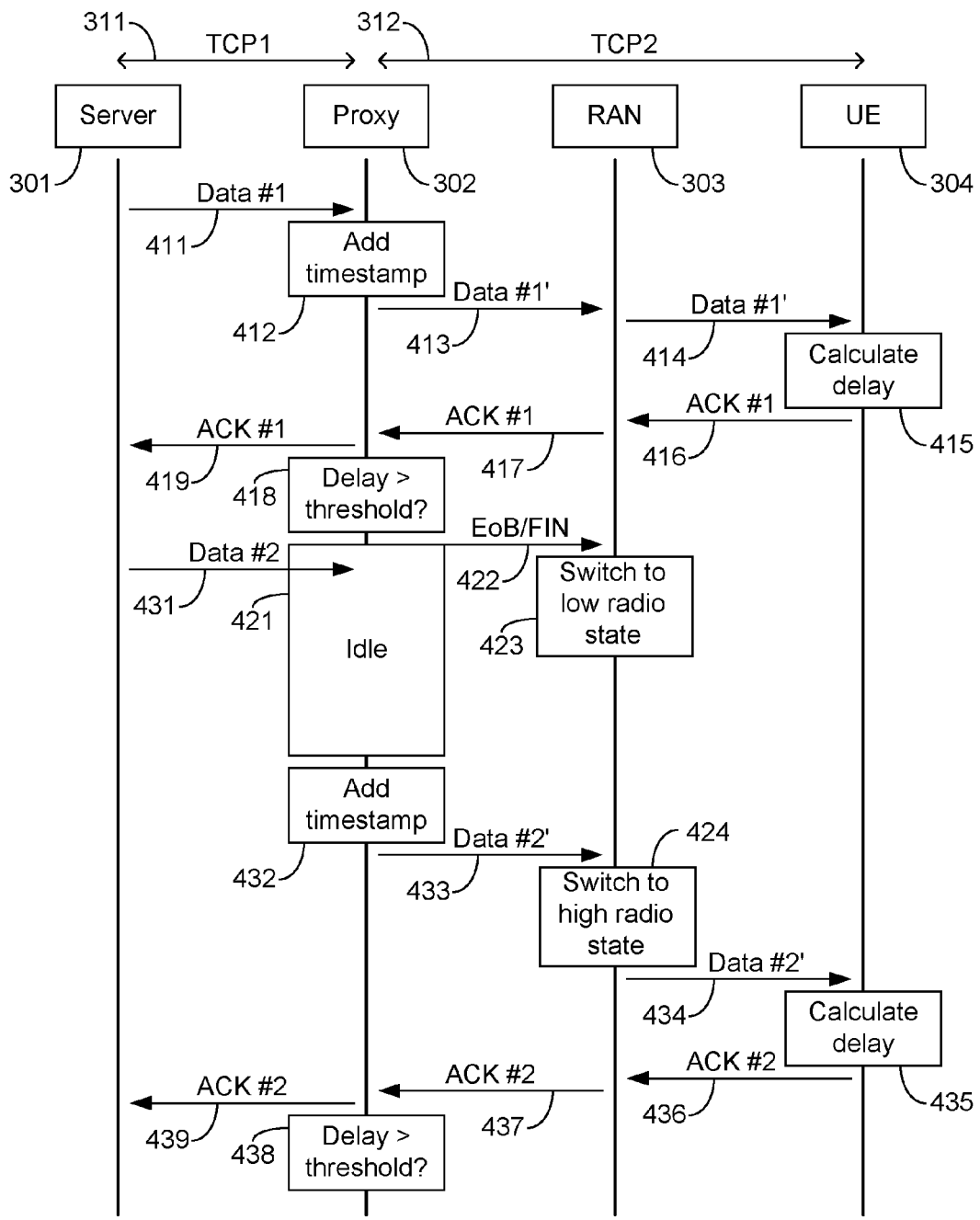
FIG. 4 is a sequence diagram illustrating congestion control in a communications network, in accordance with an embodiment of the invention.

The example illustrated in FIG. 4 starts with the server 301 transmitting, via TCP1 311, a first data packet 411 (Data #1) to the proxy 302. The proxy 302 adds a timestamp 412 to the data packet (Data #1') before forwarding 413 the data packet to the RAN 303. The timestamp represents the time of transmission 413 at the proxy 302. Typically, the timestamp is the system time of the sender, i.e., the time of transmission at the proxy 302. Subsequently, the RAN 303 transmits 414 the data packet to the UE 304. The delivery of the first data packet from the proxy 302 to the UE 304 is effected via TCP2 312.

Upon receiving 414 the first data packet, the UE 304 calculates the one-way delay 415 from the sender (proxy 302) to the receiver (UE 304) along the data path for which congestion control is performed, i.e., TCP2 312. The delay is calculated 415 as the difference between the time of reception, typically the system time of the receiver, i.e., the time of reception at the UE 304, and the timestamp received 413 in the first data packet. Then, the UE 304 acknowledges the reception 413 of the first data packet by transmitting 416 an ACK (ACK #1) to the RAN 303 which forwards 417 the ACK to the proxy 302. The ACK comprises, among other information, the calculated one-way delay. Optionally, the proxy 302 may acknowledge 419 the successful delivery of the first data packet to the server 301.

Upon receiving 417 the ACK from the UE 304, the proxy 302 compares 418 the delay calculated by the UE 304 to a threshold value. Optionally, the proxy 302 may perform additional arithmetic operations for deriving a measure of the queuing delay along the data path between the proxy 302 and the UE 304, as is known in the art. For instance, the queuing delay may be calculated by subtracting a base delay, which represents a minimum one-way delay, from the delay value received 417 from the UE 304 (see, e.g., IETF RFC 6817). In the remainder, the expression queuing delay is used and is to be understood to cover all kinds of measured or derived values of a delay suitable for assessing the flow of data packets along the data path TCP2 312, and in particular for detecting congestion along that data path.

By comparing 418 the queuing delay to a threshold value, the proxy 302 can determine whether congestion exists along the monitored data path or not. To this end, if the queuing delay exceeds a threshold value 418, the proxy 302 determines that congestion exists. The threshold value may be selected based on network configuration, network conditions, traffic, and so forth. Typically, the threshold value for the queuing delay is of the order of a few tens to several hundreds of milliseconds.

In response to the determination that congestion exists 418, the proxy 302 decreases its sending rate by increasing the time interval between subsequent transmissions of data packets, i.e., the duration of idle period 421. For instance, the time interval may be increased by multiplying a current idle period between subsequent transmissions by a factor, or by adding an additional delay to the current idle period. The factor, or the additional delay, may be dependent based on the determined queuing delay. As an example, increase in the current idle period may be proportional to a function of the difference between the queuing delay and the threshold value. Alternatively, the increase in the current idle period may be predetermined.

In conjunction with the onset of the idle period 421, the proxy 302 transmits an indication 422 pertaining to the onset of the idle period to the RAN 303. The indication may be transmitted 422 simultaneously, i.e., at the same time, with the onset of the idle period 421 or shortly after. The indication may be a signal, or message, which is transmitted 422 from the proxy 302 to a control node of the RAN 303, i.e., a node which is in charge of controlling radio resources of the RAN 303 by ordering the UE 304, and an access node of the RAN 303 with which the UE 304 communicates, to switch radio states. For instance, the indication may be an EoB indicating that transmission of a burst, or chunk, of data has terminated. Optionally, the indication may comprise information pertaining to the duration of the idle period 421.

As an alternative, the transmitted indication 422 may be a FIN packet indicating that the proxy 302 is about to terminate TCP2 312. For the sake of clarity, the signaling associated with terminating a TCP session other than transmitting a FIN packet 422 is omitted in FIG. 4.

Figure 1:
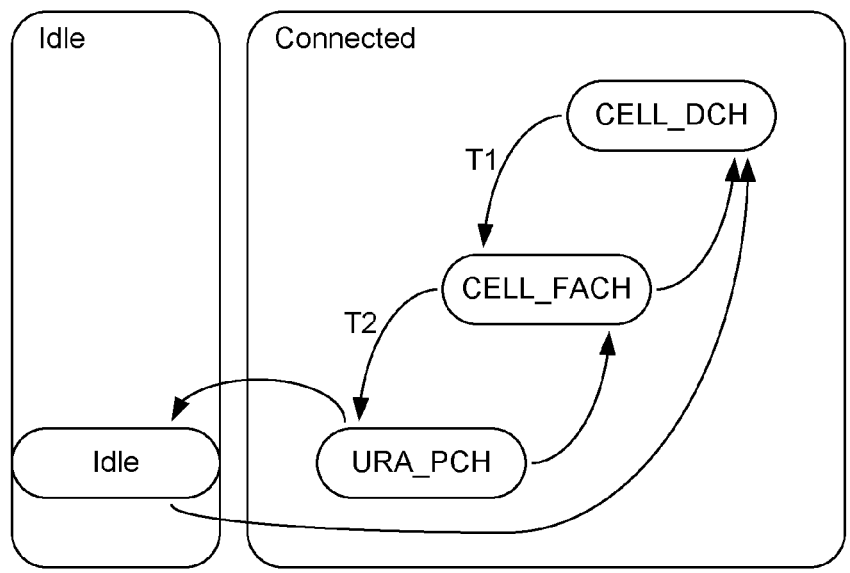
FIG. 1 shows the RRC states in a UMTS network.

In response to receiving the indication 422 pertaining to the onset of the idle period 421, the control node of the RAN 303 effects switching of radio states in the access node of the RAN 303 and the UE 304. The process of switching radio states is known in the art and typically involves control signaling between the control node of the RAN 303 and the access node of the RAN 303 as well as the UE 304 for effecting a simultaneous switching of radio states on either end of the wireless link 310. For instance, if the access node of the RAN 303 and the UE 304 are in a high-bitrate radio state, such as a CELL_DCH state supporting High Speed Packet Access (HSPA), the control node of the RAN 303 may effect a state change to CELL_FACH or URA_PCH (see FIG. 1) in response to receiving the indication 422. The decision whether to switch to a lower radio state or not may depend on the presence of other traffic flows in which the UE 304 is engaged in. In addition to that, information pertaining to the duration of the idle period 421, which is received with the indication 422, may be taken into account. For instance, the control node may switch to a radio state having an intermediate bitrate and resource consumption rather than to a state having a low bitrate and resource consumption in the event that the duration of the idle period 421 is too short.

Data which is received by the proxy 302 during the idle period 421, e.g., a second data packet (Data #2) transmitted 431 by the server 301 over TCP1 311, is not forwarded directly to the UE 304 but delayed at the proxy 302 until the idle period 421 has lapsed. After the idle period 421 has lapsed, the proxy 302 adds a timestamp 432 to the second data packet, as was described hereinbefore with respect to the first data packet. Subsequently, the proxy 302 transmits the second data packet 433 (Data #2') to the RAN 303 which, in response to receiving the second data packet 433, effects switching to a higher radio state. In correspondence to what has been described with respect to switching of radio states above, a control node of the RAN 303 is typically in charge of effecting switching by means of control signaling between the control node of the RAN 303 and the access node of the RAN 303 as well as the UE 304 for effecting a simultaneous switching of radio states on either end of the wireless link 310.

After switching to a higher radio state 424, the Ran 303 transmits the second data packet 434 to the UE 304 which, in response to receiving the second data packet 434, calculates the one-way delay 435 for transmitting the second data packet from the proxy 302 to the UE 304 via TCP2 312, as was described hereinbefore with respect to the first data packet. Further, the UE 304 transmits an ACK 436 comprising the calculated delay to the RAN 303 and further 437 to the proxy 302. Optionally, the proxy 302 may acknowledge 439 the successful delivery of the second data packet to the server 301.

Then, the proxy 302, in correspondence to what has been described above, determines whether congestion exists on the data path along TCP2 312 by comparing the queuing delay 438, either the one-way delay calculated by UE 304 or a suitable delay measure derived from the one-way delay, to the threshold value. Depending on the outcome of the comparison 438, the idle period between subsequent transmissions of data packets over TCP2 312 is adjusted, and the sequence continues in a way similar to what has been described above with reference to delivery of the first data packet.

It will also be appreciated by the person skilled in the art that data packets transmitted from the server 301 to the UE 304 may be acknowledged by the proxy 302 directly, i.e., without awaiting an acknowledgement from the UE 304 over TCP2 312. For instance, in response to receiving the first data packet 411 from the server 301, the proxy 302 may directly transmit an ACK 419 to the server 301 rather than awaiting the ACK transmitted 417 from the UE 304. In addition, the proxy 302 may be provided with storage for buffering data received from the server 301, such as data packets 411 and 431, as well as additional data packets which may be received during the idle period 421. In the latter case, the server 301 may continue sending data packets to the UE 304, which data packets are buffered at the proxy 302 and directly acknowledged.

Optionally, the transmission of the indication 422 pertaining to the idle period 421 by the proxy 302 may be conditional on the duration of the idle period 421. For instance, the proxy 302 may refrain from sending the indication 422 in the event that the duration of the idle period 421 is too short to justify switching to a lower radio state by the RAN 303. Thus, the decision of whether switching of radio states should be effected may be taken, or influenced, by the proxy 302 (sending the indication 422 or not) and/or the control node of the RAN 303 (switching of radio states in response to receiving indication 422 or not).

Figure 2:
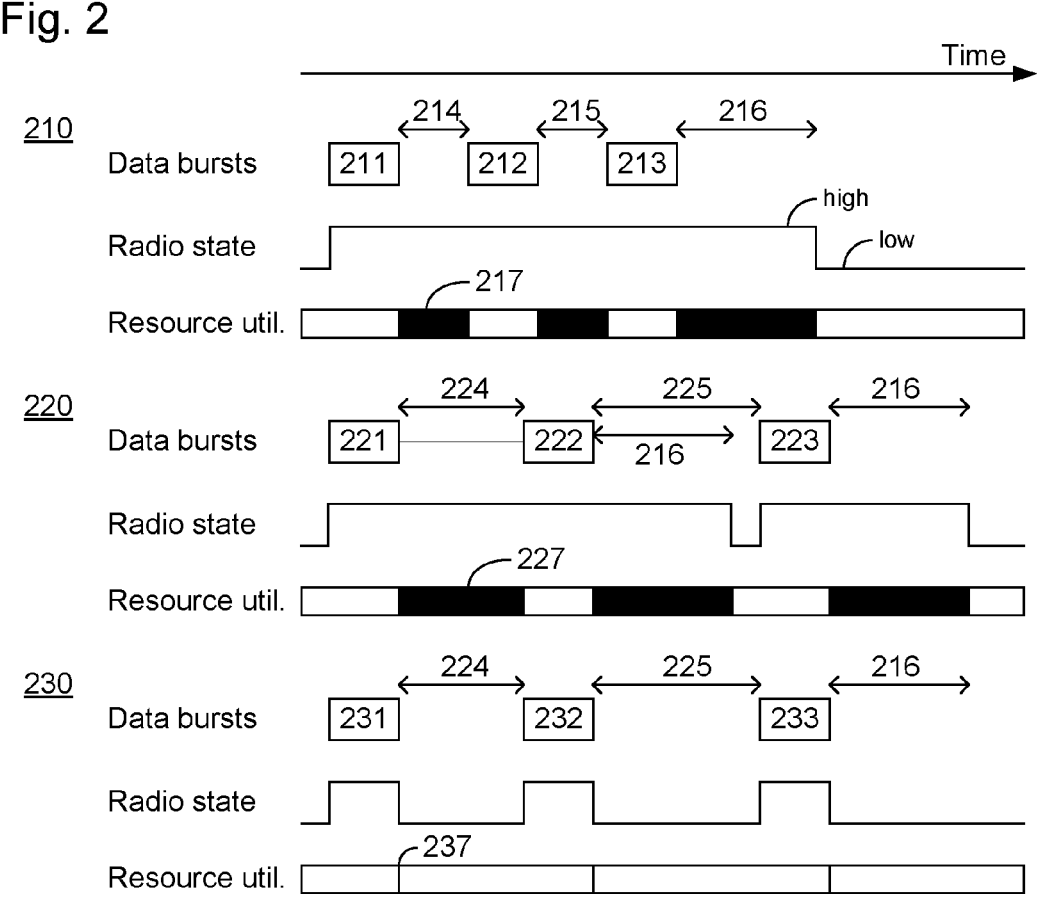
FIG. 2 illustrates resource utilization of the RAN and the UE.

The gain in resource utilization which may be achieved by congestion control in accordance with an embodiment of invention is exemplified in diagram 230 of FIG. 2. In diagram 230, the idle periods 224 and 225 between subsequent data bursts 231-233 are illustrated as having the same duration as the corresponding idle periods in diagram 220. However, in contrast to diagram 220, the RAN 303 and the UE 304 may use opportunities for switching to the low radio state after transmission of each of the bursts 231-233 has terminated. This results in a reduced amount of wasted resources, as is indicated in the lower part of diagram 230 (the amount of resources marked as black 237 are minimized). Note that, the amount of non-utilized, or wasted, resources for congestion control in accordance with an embodiment of the invention will depend on the exact timing between interrupting the transmission of data packets and transmitting the indication pertaining to the interruption. In FIG. 2, diagram 230, it is assumed that the indication is transmitted simultaneously with the onset of the idle period.

Figure 5:
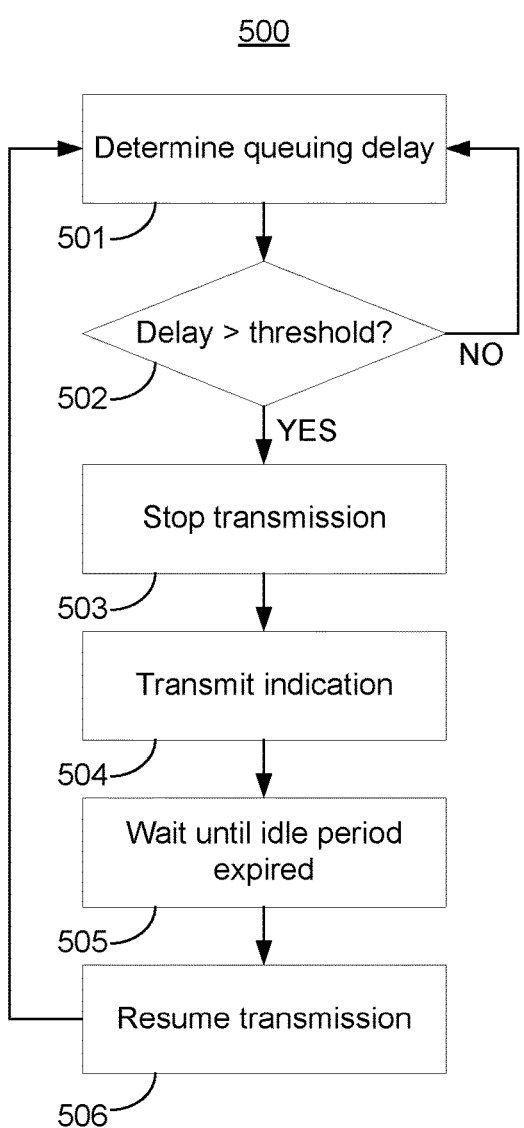
FIG. 5 is a flow chart of a method of congestion control in a communications network, in accordance with an embodiment of the invention.

In the following, with reference to FIG. 5 and what has been described hereinbefore, an embodiment of the method 500 of congestion control in a communications network, such as communications network 300, is disclosed. Method 500 comprises determining a queuing delay 501, comparing the queuing delay to a threshold, and determining that congestions exists along the monitored data path if the queuing delay exceeds the threshold 502, decreasing the transmission rate of data packets by stopping transmission 503 for an idle period, transmitting an indication 504 pertaining to the onset of the idle period, and resuming transmission 506 after the idle period has expired 505. If the queuing delay does not exceed the threshold 502, method 500 starts over with determining the queuing delay 501 for a subsequently transmitted data packet.

The queuing delay may be determined 501 based on a one-way delay calculated by the receiver on the data path for which congestion control is performed, e.g., UE 304. As an alternative to the queuing delay, any other suitable measure of delay or congestion along the data path may be used. The threshold which the queuing delay is compared to 502 may be predetermined or derived from network configuration, network conditions, traffic, and so forth. The steps of stopping transmission 503, waiting until the idle period has expired 505, and resuming transmission 506, amount to interrupting transmission of data packets from the sending node, e.g., the proxy 302 to the receiving node, e.g., the UE 304, during an idle period. The idle period may be predetermined or derived from network configuration, network conditions, traffic, and so forth. The indication which is transmitted 504 in connection with the onset of the idle period may be a separate signal, e.g., an EoB, or a FIN packet which initiates the termination of the TCP connection between the sender and the receiver, e.g., TCP2 312 between the proxy 302 and the UE 304. The indication is transmitted to a control node of the RAN through which the receiver accesses the communications network, such as the control node of RAN 303. In response to receiving the indication, the control node may effect switching to a lower radio state in an access node of the RAN 303 and the receiver, i.e., the UE 304.

Figure 6:
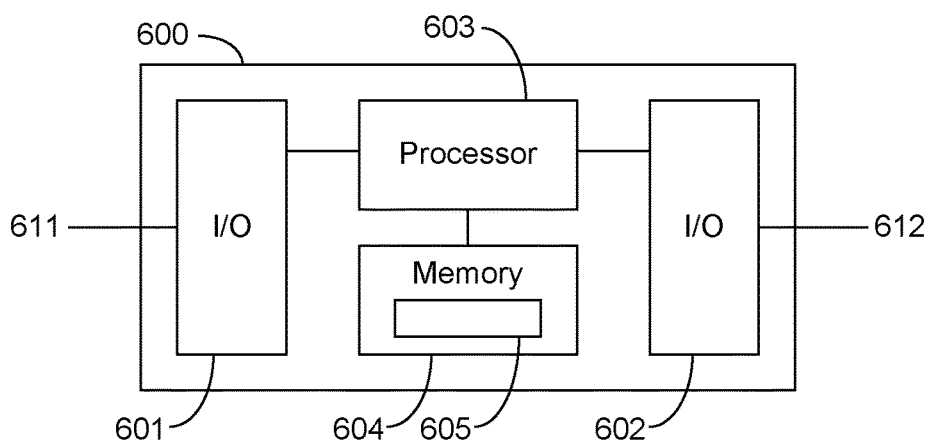
FIG. 6 shows a proxy for congestion control in a communications network, in accordance with an embodiment of the invention.

With reference to FIG. 6, and what has been described hereinbefore, an embodiment of the network node 600 for congestion control in a communications network, such as the proxy 302 of communications network 300, is described.

Network node 600 comprises a first network interface 601, a second network interface 602, a processor 603, and a memory 604. The first 601 and second 602 network interfaces are configured for receiving data from and transmitting data to other nodes of the communications network. For instance, the first network interface 601 may be configured for communicating with the server 301, and the second network interface 602 may be configured for communicating with a node of the RAN 303, e.g., a control node or an access node of the RAN 303. It will also be appreciated that an embodiment of the invention may comprise a single network interface only, which is configured for communicating with both the server 301 and the RAN 303. The memory 604 comprises instructions 605 which are executable by the processor 603, i.e., a computer program or software. If executed, the network node 600 is operative to perform in accordance with an embodiment of the method of congestion control described hereinbefore. In particular, the network node 600 is operative to detect congestion for data packets being transmitted along a data path between a sending node of the communications network, e.g., the proxy 302, and a receiving node of the communications network, e.g., the UE 304, wherein the receiving node accesses the communications network via RAN 303. The network node 600 is further operative to interrupt transmission of data packets to the receiving node during an idle period, and to transmit an indication pertaining to the interruption of transmission to the RAN 303.

An embodiment of the invention, implemented as a computer program or software 605, for execution on a processor 603, either a general purpose processor or a Digital Signal Processor (DSP), may be provided as memory 604, a memory stick, or any other type of data carrier. It will also be appreciated that an embodiment of the computer program 605 may be provided by means of downloading the computer program over a communication network.

As an alternative, an embodiment of the network node for congestion control in a communications network, such as the proxy 302, may comprises means which are adapted to detect congestion for data packets being transmitted from a sending node of the communications network to a receiving node of the communications network, wherein the receiving node accesses the communications network via a RAN, to interrupt transmission of data packets to the receiving node during an idle period, and to transmit an indication pertaining to the interruption of transmission to the RAN.

As yet a further alternative, an embodiment of the for congestion control in a communications network, such as the proxy 302, may comprise means for detecting congestion for data packets being transmitted from a sending node of the communications network to a receiving node of the communications network, wherein the receiving node accesses the communications network via a RAN, means for interrupting transmission of data packets to the receiving node during an idle period, and means for transmitting an indication pertaining to the interruption of transmission to the RAN.

The person skilled in the art realizes that the invention by no means is limited to the embodiments described above. On the contrary, many modifications and variations are possible within the scope of the appended claims.

The invention claimed is:

1. A method of congestion control in a communications network, the method comprising:
   a first network node transmitting to a second network node of a radio access network (RAN) a first data packet addressed to a wireless communication device (WCD), the second network node being configured to wirelessly forward the first data packet to the WCD;
   after transmitting the first data packet, the first network node detecting congestion in a data path between the first network node and the WCD;
   as a result of detecting the congestion, the first network node i) transmitting to the second network node an idle period indication indicating that the first network node is delaying data transmissions to the WCD and ii) initiating an idle period, wherein the idle period is determined by increasing a duration of a pervious idle period;
   the first network node detecting that the idle period has expired; and
   as a result of detecting that the idle period has expired, the first network node transmitting to the second network node for forwarding to the WCD a second data packet addressed to the WCD, wherein
   during the idle period, the first network node does not transmit to the second network node any data packet addressed to the WCD.

2. The method according to claim 1, wherein the idle period indication is an end-of-burst (EOB) indicator.

3. The method according to claim 1, wherein the idle period indication comprises a Transmission Control Protocol (TCP) termination indication.

4. The method according to claim 1, wherein the second network node is a control node of the RAN.

5. The method according to claim 1, wherein the detecting congestion comprises:
   the first network node determining a queuing delay for the data path;
   the first network node comparing the queuing delay to a predetermined threshold value;
   as a result of determining that the queuing delay exceeds the predetermined threshold value, the first network node determining that congestion in the data path exists.

6. The method according to claim 5, wherein the determining the queuing delay comprises:
   the first network node adding a time stamp to the first data packet indicating a time of transmission to the second node; and
   the first network node receiving an acknowledgment from the WCD in response to the first data packet, wherein the acknowledgement includes the queuing delay for the data path, and
   the queuing delay is based on a time difference between the time of transmission of the first data packet and a time of receipt of the first data packet by the WCD.

7. A computer program product comprising a non-transitory computer readable medium storing a computer program code, the computer program code being adapted, if executed on a processor, to implement the method according to claim 1.

8. A first network node for congestion control in a communications network, the first network node comprising a processor and a memory comprising instructions executable by the processor, whereby the network node is operative to:
   transmit to a second network node of a radio access network (RAN) a first data packet addressed to a wireless communication device (WCD), the second network node being configured to wirelessly forward the first data packet to the WCD;
   after transmitting the first data packet, detect congestion in a data path between the first network node and the WCD;
   as a result of detecting the congestion, i) transmit to the second network node an idle period indication indicating that the first network node is delaying data transmissions to the WCD and ii) initiate an idle period, wherein the idle period is determined by increasing a duration of a previous idle period;
   detect that the idle period has expired; and
   as a result of detecting that the idle period has expired, transmit to the second network node for forwarding to the WCD a second data packet addressed to the WCD, wherein
   during the idle period, the first network node does not transmit to the second network node any data packet addressed to the WCD.

9. The first network node according to claim 8, wherein the idle period indication is an end-of-burst (EOB) indicator.

10. The first network node according to claim 8, wherein the indication comprises a Transmission Control Protocol (TCP) termination indication.

11. The first network node according to claim 8, wherein the second network node is a control node of the RAN.

12. The first network node according to claim 8, wherein the first network node is operative to detect congestion by:
   determining a queuing delay for the data path;
   comparing the queuing delay to a predetermined threshold value;

as a result of determining that the queuing delay exceeds the predetermined threshold, deciding that congestion in the data path exists.

13. The first network node according to claim 12, wherein the first network node is operative to determine the queuing delay by:
adding a time stamp to the first data packet indicating a time of transmission to the second node; and
receiving an acknowledgment from the WCD in response to the first data packet, wherein
the acknowledgement includes the queuing delay for the data path, and
the queuing delay is based on a time difference between the time of transmission of the first data packet and a time of receipt of the first data packet by the WCD.

14. The method according to claim 1, the method further comprising:
the first network node establishing a first TCP connection with a server in the communications network; and
the first network node establishing a second TCP connection with the WCD.

15. The method according to claim 14, the method further comprising:
the first network node receiving a data packet transmitted by the server over the first TCP connection; and
the first network node modifying the received data packet to form the first data packet, wherein modifying the received data packet comprises adding a timestamp to the data packet.

16. The method according to claim 1, wherein increasing the duration of the previous idle period comprises one of: i) multiplying the previous idle period by a factor that is based on a queuing delay determined for the data path and ii) adding an additional delay to the previous idle period, the additional delay based on a queuing delay determined for the data path.

17. The first network node according to claim 8, wherein increasing the duration of the previous idle period comprises one of: i) multiplying the previous idle period by a factor that is based on a queuing delay determined for the data path and ii) adding an additional delay to the previous idle period, the additional delay based on a queuing delay determined for the data path.

* * * * *